US008115717B2

(12) United States Patent
Ruckmongathan

(10) Patent No.: US 8,115,717 B2
(45) Date of Patent: Feb. 14, 2012

(54) METHOD AND SYSTEM FOR LINE BY LINE ADDRESSING OF RMS RESPONDING DISPLAY MATRIX WITH WAVELETS

(75) Inventor: Temkar Narasingarao Ruckmongathan, Karnataka (IN)

(73) Assignee: Raman Research Institute, Bangalore (IN)

( * ) Notice: Subject to any disclaimer, the term of this patent is extended or adjusted under 35 U.S.C. 154(b) by 979 days.

(21) Appl. No.: 11/769,940

(22) Filed: Jun. 28, 2007

(65) Prior Publication Data

US 2008/0316231 A1 Dec. 25, 2008

(30) Foreign Application Priority Data

Jun. 19, 2007 (IN) ......................... 01266/CHE/2007

(51) Int. Cl.
*G09G 3/36* (2006.01)
*G09G 5/00* (2006.01)
*G06F 3/038* (2006.01)

(52) U.S. Cl. ............................. 345/94; 345/87; 345/204

(58) Field of Classification Search .............. 345/33–39, 345/50–51, 53, 87–102, 204, 209–214, 690–699
See application file for complete search history.

(56) References Cited

U.S. PATENT DOCUMENTS 4,770,502 A * 9/1988 Kitazima et al. ................ 345/97
4,814,760 A * 3/1989 Johnston et al. .............. 345/104
5,475,397 A * 12/1995 Saidi ............................... 345/95
5,594,466 A * 1/1997 Yamamoto et al. ........... 345/100
5,610,628 A * 3/1997 Yamamoto et al. ........... 345/100
5,689,280 A * 11/1997 Asari et al. ....................... 345/89
5,734,364 A * 3/1998 Hirai et al. ....................... 345/95
5,861,869 A * 1/1999 Scheffer et al. ............... 345/691
5,877,738 A * 3/1999 Ito et al. .......................... 345/94
6,611,246 B1 * 8/2003 Ito et al. .......................... 345/94
7,403,195 B2 * 7/2008 Sako et al. .................... 345/204
2003/0193491 A1 * 10/2003 Lawrence et al. ............. 345/204
2005/0134530 A1 * 6/2005 Khurana et al. ................ 345/50
2009/0002300 A1 * 1/2009 Ruckmongathan ............. 345/89
2009/0201241 A1 * 8/2009 Ruckmongathan ............. 345/95
2010/0238103 A1 * 9/2010 Ruckmongathan ............. 345/89

OTHER PUBLICATIONS

Ruckmongathan, T.N., "Addressing Techniques for RMS Responding LCDs—A Review", Asahi Glass Co., Ltd., Yokohama, Kanagawa, Japan, Japan Display '92, pp. 77-80, Date Unknown.
Conner, A.R., Scheffer, T.J., "Pulse-Height Modulation (PHM) Gray Shading Methods for Passive Matrix LCDs", In Focus Systems, Inc., Tualatin, OR, USA, Japan Display '92, pp. 69-72, Date Unknown.

(Continued)

*Primary Examiner* — Bipin Shalwala
*Assistant Examiner* — Matthew Fry
(74) *Attorney, Agent, or Firm* — Harness, Dickey & Pierce, PLC

(57) ABSTRACT

A method for line-by-line addressing of RMS responding display matrix with wavelets, said method comprises steps of: selecting the wavelets such that energy of them is proportional to an integer power of two to form a wavelet matrix; obtaining select waveform profile by summing elements of column in the wavelet matrix; obtaining column waveforms by dot product of data with column of the wavelet matrix; and applying the select waveform and the corresponding column waveforms by selecting one row of the display matrix at a time.

15 Claims, 7 Drawing Sheets

OTHER PUBLICATIONS

Figure 1:
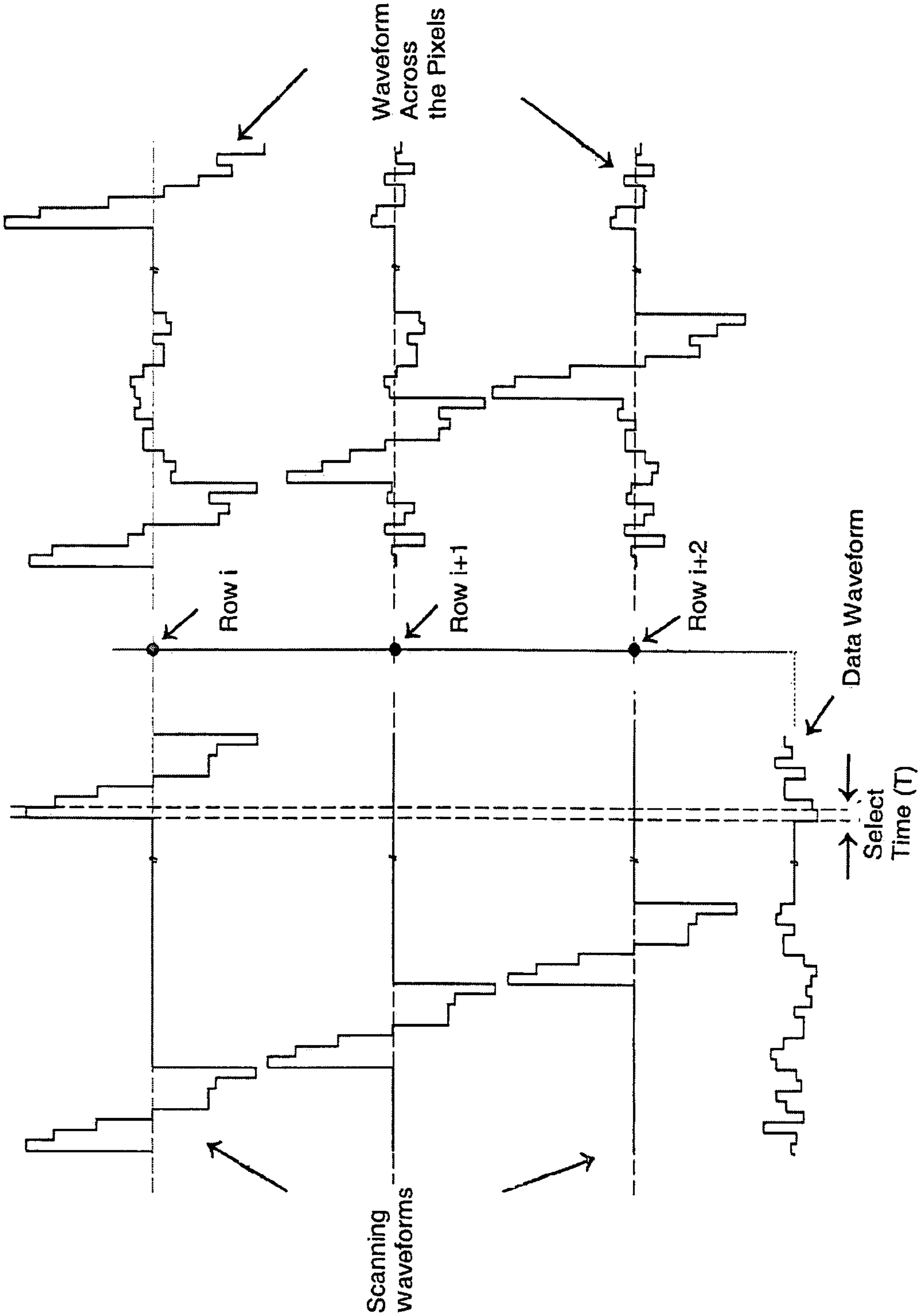

Ruckmongathan, T.N., "A Successive Approximation Technique For Displaying Gray Shades In Liquid Crystal Displays (LCDs)", IEEE Transactions on Image Processing, vol. 16, No. 2, Feb. 2007, pp. 554-561.
Ruckmongathan, T.N., Rao P, Nanditha, Prasad, Ankita, "Wavelets for Displaying Gray Shades in LCDs", SID 05 Digest, pp. 168-171, 2005.
Ruckmongathan, T.N., Manasa, U., Nethravathi, R., Shashidhara, A.R., "Integer Wavelets For Displaying Gray Shades in RMS Responding Displays", Journal of Display Technology, vol. 2, No. 3, Sep. 2006, pp. 292-299.
Suzuki, Yoshio; Sekiya, Mitsunobu; Arai, Kunihiko; Ohkoshi, Akio, "A Liquid-Crystal Image Display", Sony Corp., Tokyo, Japan, SID 83 Digest, pp. 32-33, 1983.
Kawakami, Hideaki; Hanmura, Hisao; Kaneko, Eiji; "Brightness Uniformity in Liquid Crystal Displays", Hitachi Research Laboratory, Ibaraki, Japan, SID 80 Digest, pp. 28-29, Date Unknown.
Kawakami, H.; Nagae, Y.; Kaneko, E., "Matrix Addressing Technology of Twisted Nematic Liquid Crystal Display", Hitachi Research Laboratory, Hitachi, Ltd., Hitachi, Ibaraki, 319-12 Japan, pp. 50-52, Date Unknown.
Ruckmongathan, T.N.; Govind, M.; Deepak, G.; "Reducing Power Consumption in Liquid-Crystal Displays", IEEE Transactions on Electron Devices, vol. 53, No. 7, Jul. 2006, pp. 1559-1566.
Ruckmongathan, T.N.; Nadig, Deepa S.; Ranjitha, P.R., "Gray Shades in RMS Responding Displays With Wavelets Based on the Slant Transform", IEEE Transactions on Electron Devices, vol. 54, No. 4, Apr. 2007, pp. 663-670.

* cited by examiner

METHOD AND SYSTEM FOR LINE BY LINE ADDRESSING OF RMS RESPONDING DISPLAY MATRIX WITH WAVELETS

FIELD OF INVENTION

The field of invention is related to a line-by-line addressing technique and a technique that is based on wavelets is proposed to obtain gray shades in RMS (root-mean-square) responding matrix displays. A large number of gray shades can be displayed with less number of voltages in the addressing waveforms and hence have simple drivers as compared to amplitude modulation and less number of time intervals as compared to the frame modulation. The technique is demonstrated by displaying 128 gray shades in a liquid crystal display (LCD).

BACKGROUND OF INVENTION AND PRIOR ART

Amplitude modulation [1] was the first ever technique that attempted to display a large number of gray shades. Hardware complexity of the data drivers is high for this technique because 2(G−1) voltages are necessary in the data waveforms to display G gray shades. Hardware complexity will be less if analog sample and hold type drivers are used instead of the digital drivers but the power consumption will be high. The pulse height modulation [2] for displaying gray shades is similar to the amplitude modulation and hence has the same merits and demerits as the amplitude modulation. The successive approximation techniques [3] can display a large number of gray shades with the simple drivers as that of bi-level displays (with pixels driven to either ON or OFF states). Hardware complexity of the modified voltage level generator and a few analog multiplexers that are necessary to achieve gray shades in a bi-level display is not significant as compared to the increase hardware complexity of the drivers if amplitude modulation or pulse height modulation is used for displaying a large number of gray shades. Reduction in the hardware complexity of the drivers has a high impact on the overall hardware complexity and the cost because the number of drivers is large (sum of the rows and columns in the matrix display). However, supply voltage of the driver circuit of the successive approximation technique increases with the number of gray shades. Wavelets can be used to display gray shades (for driving or matrix addressing) in liquid crystal displays (LCD) and it was demonstrated [4] recently. Wavelets can be used to reduce the supply voltage and hardware complexity of the drivers [5], [6] in RMS responding displays, especially when the number of gray shades is large. All these addressing techniques are based on selecting several address lines simultaneously while scanning the matrix displays. Our objective is to show that the simple line-by-line addressing can be used to display a large number of gray shades without much increase in the hardware complexity of the drivers and without much increase in supply voltage. A line-by-line addressing that is based on using wavelets is proposed in this paper. Effective utilization of wavelets is illustrated with an example: displaying 128 gray shades in a passive matrix LCD using the Haar wavelets. However, the wavelet matrices for 32 and 64 gray shades are also given in this paper.

BRIEF DESCRIPTION OF ACCOMPANYING DRAWINGS

FIG. 1: shows typical waveforms when the matrix display is scanned with waveforms derived from wavelets. Scanning (row) waveforms have seven voltages and the column (data) waveforms have twenty-one voltages.

Figure 2:
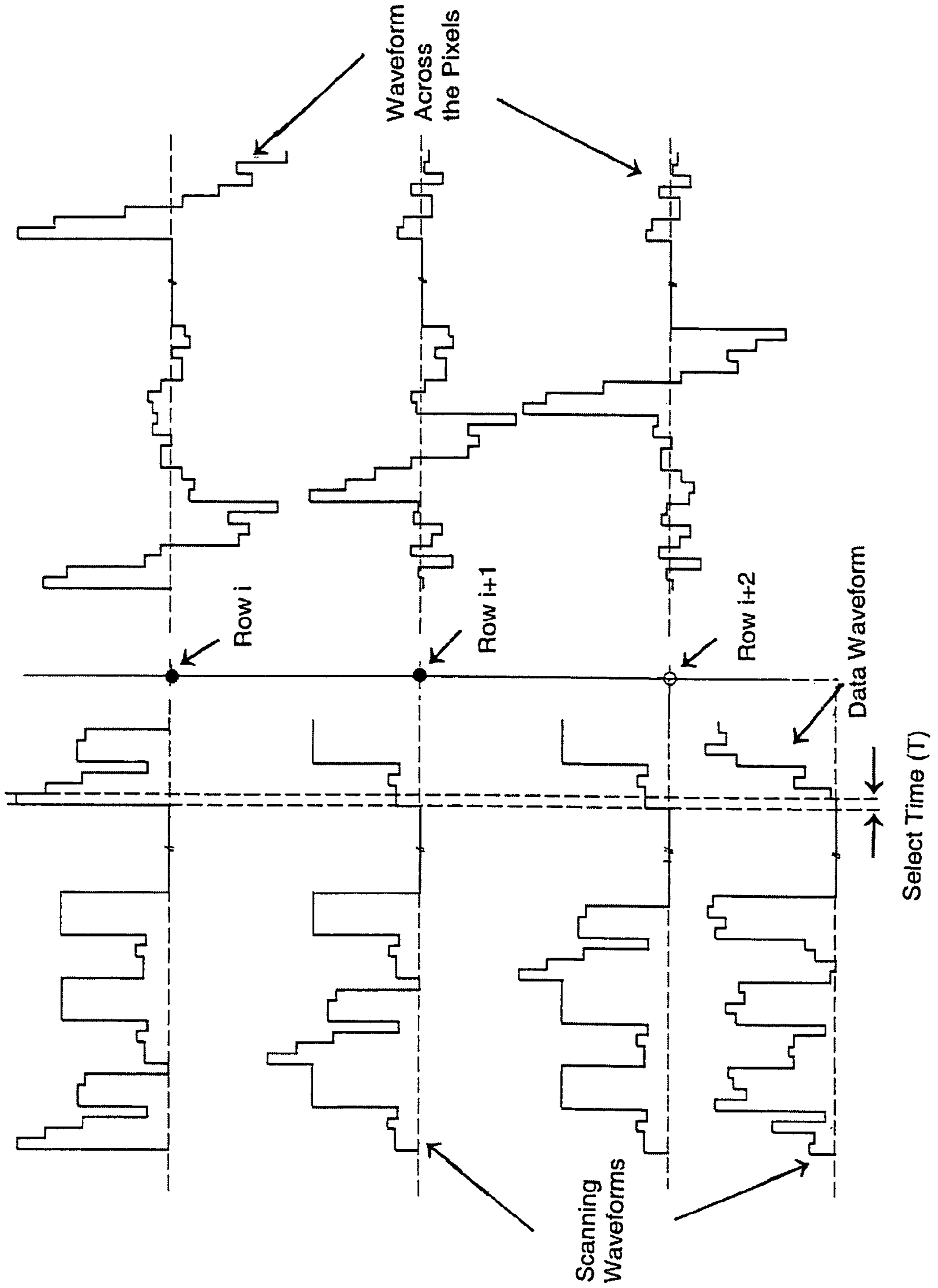

FIG. 2: shows typical waveforms when the row (scanning) and column (data) waveforms are modified to reduce the supply voltage. Both the row and column waveforms are shifted by the same amount. Hence, the waveform across the pixels is same as that in FIG. 1 although the row and column waveforms differ from that of FIG. 1.

Figure 3:
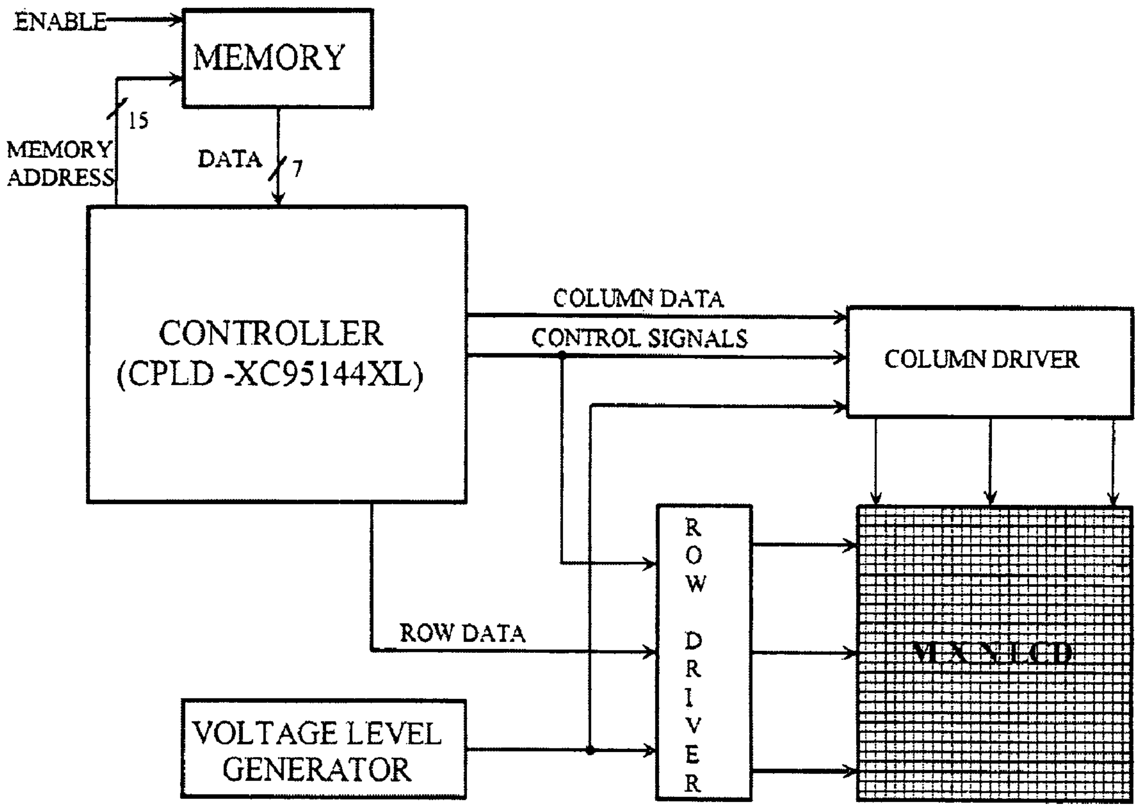

FIG. 3: shows block diagram of the prototype of a 32×32 matrix liquid crystal display that is scanned using a line-by-line addressing technique that is based on wavelets.

FIG. 4: are illustrations of a 32×32 matrix LCD driven by the wavelet based line-by-line addressing technique. It is capable of displaying 128 gray shades.

Figure 5:
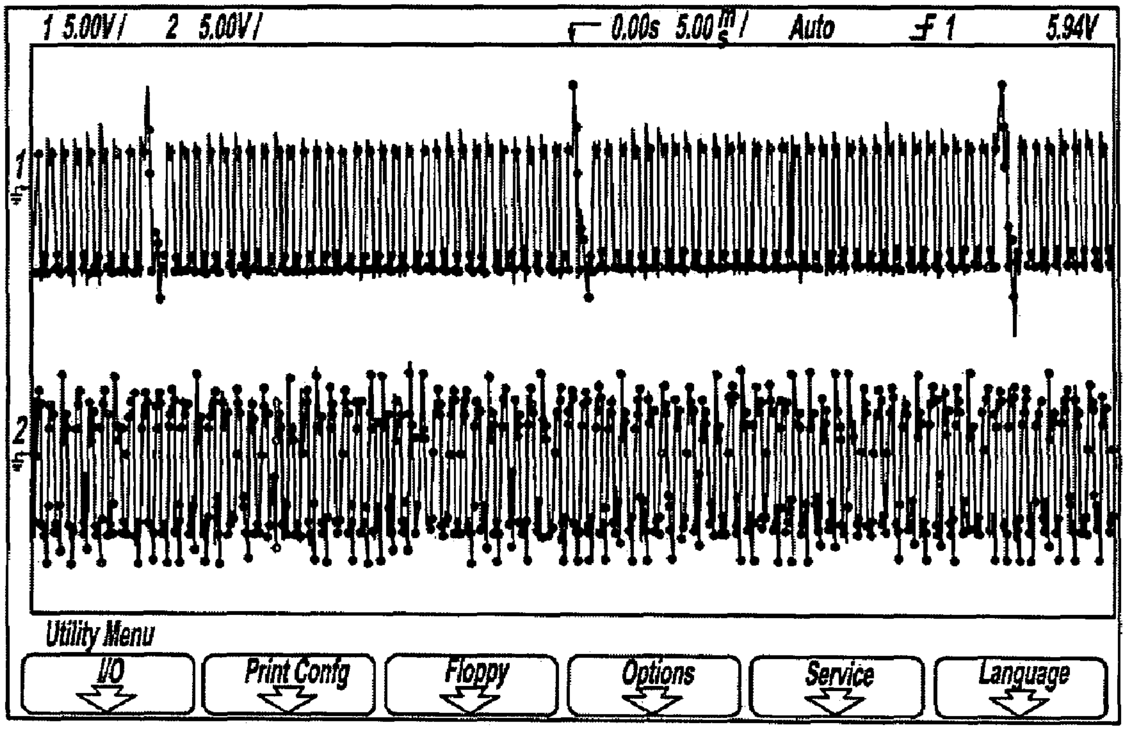

FIG. 5: shows typical scanning (upper trace) and data (lower trace) waveforms of the wavelets based line-by-line addressing technique.

Figure 6:
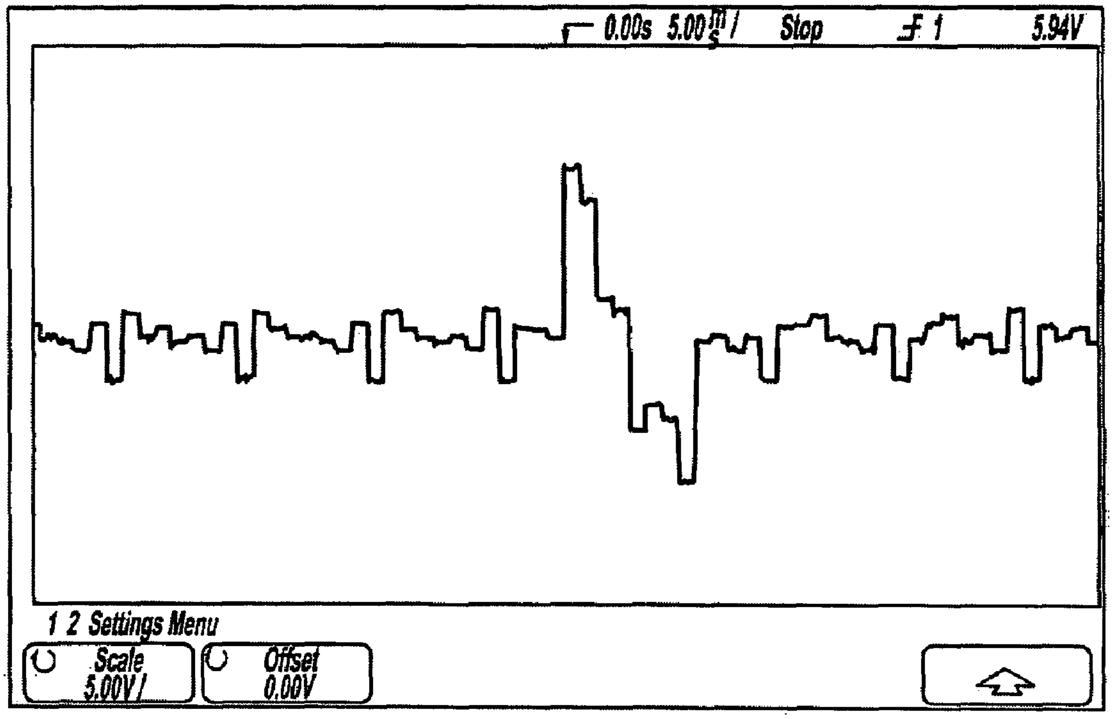

FIG. 6: shows waveform across a pixel in the display (part of a cycle is shown here for the sake of clarity.

OBJECT OF THE INVENTION

The primary objective of the invention is to develop a method for line-by-line addressing of RMS responding display matrix with wavelets.

Another objective of the invention is selecting the wavelets such that energy of them is proportional to an integer power of two to construct a wavelet matrix;

Still another objective of the invention is obtaining select waveform profile by summing elements of column in the wavelet matrix;

Still another objective of the invention is obtaining column waveforms by dot product of some of the data bits with column of the wavelet matrix;

Still another objective of the invention is applying the select waveforms and the corresponding column waveforms by selecting one row of the matrix display at a time.

Yet another main objective of the present invention is to develop a system for line-by-line addressing of RMS responding display matrix with wavelets.

Still another main objective of the present invention is to develop a matrix liquid crystal display (LCD) to display image and a row driver to drive the rows of the matrix LCD with row waveform.

Still another main objective of the present invention is to develop a column driver to drive the columns of the matrix LCD with column waveform.

Still another main objective of the present invention is to develop a voltage level generator to facilitate the row driver and the column to generate the desired waveforms.

Still another main objective of the present invention is to develop a controller to control the system for line-by-line addressing.

STATEMENT OF INVENTION

The present invention is related to a method for line-by-line addressing of RMS responding display matrix with wavelets, said method comprises steps of: selecting the wavelets such that energy of them is proportional to an integer power of two to form wavelet matrix; obtaining select waveform profile by summing elements of columns in the wavelet matrix; obtaining column waveforms by dot product of data with column of the wavelet matrix; and applying the select waveform and the corresponding column waveforms by selecting one row of the display matrix at a time; and a system for line-by-line addressing of RMS responding display matrix with wavelets comprising: a matrix liquid crystal display (LCD) to display image; a row driver to drive the rows of the matrix LCD with row waveform; a column driver to drive the columns of the matrix LCD with column waveform; a voltage level generator to facilitate the row driver and the column to generate desired waveforms, and a controller to control the system for line-by-line addressing.

DETAILED DESCRIPTION OF INVENTION

The primary embodiment of the invention is a method for line-by-line addressing of RMS responding display matrix with wavelets, said method comprises steps of: selecting the wavelets such that energy of them is proportional to an integer power of two to form a wavelet matrix; obtaining select waveform profile by summing elements of column in the wavelet matrix; obtaining column waveforms by dot product of data with column of the wavelet matrix; and applying the select waveform and the corresponding column waveforms by selecting one row of the display matrix at a time.

In yet another embodiment of the present invention row of the display matrix is selected with waveform that is proportional to the waveform that is obtained by adding 'g' wavelets wherein 'g' is number of data bits.

In still another embodiment of the present invention, a constant of proportionality is added to the column waveform and the select waveform.

In still another embodiment of the present invention, the column waveform is obtained by summing products of value assigned to the data bit and the corresponding wavelets.

In still another embodiment of the present invention both the select and the column waveforms are shifted by predetermined time interval in order to reduce power supply voltage of driver circuit.

In still another embodiment of the present invention order of voltage in the select waveform is changed as long as one to one correspondence among the wavelets and the data bits is maintained while computing the column waveform to reduce power consumption.

In still another embodiment of the present invention the select waveform voltage is distributed into several frames.

In still another embodiment of the present invention the data bits is assigned with values '+1' and '−1' when the bit is logical '0' and '1' respectively.

In still another embodiment of the present invention rows other then the selected row are maintained at ground.

In still another embodiment of the present invention number of voltages in the select waveform and the column waveform determines amount of gray shades of the display matrix.

In still another embodiment of the present invention the amount of gray shades increases with increase in the number of voltages in the row waveform and the column waveform.

In still another embodiment of the present invention the wavelet is Haar wavelet.

In still another embodiment of the present invention the wavelets are DC free.

Another main embodiment of the present invention a system for line-by-line addressing of RMS responding display matrix with wavelets comprising: a matrix liquid crystal display (LCD) to display image; a row driver to drive the rows of the matrix LCD with row waveform; a column driver to drive the columns of the matrix LCD with column waveform; a voltage level generator to facilitate the row driver and the column to generate desired waveforms, and a controller to control the system for line-by-line addressing.

In yet another embodiment of the present invention the row drivers that are capable applying just one of the two voltages are used; wherein a pair of multiplexers that are common to all the row drivers selects these two voltages. Similarly, the a set of multiplexers that are common to all the data (column) drivers is used to reduce the hardware complexity of the data drivers.

LCD is a slow responding device and its electro-optic response does not follow the abrupt changes in the electric field across the pixels. State of a pixel is determined by the energy delivered to it as long as the period of the addressing waveforms is less as compared to the response times of the display (RMS response). Hence, gray shades can be displayed by modulating the energy delivered to the pixels by using a set of orthogonal wavelets. For example, the seven Haar wavelets that are used in our prototype (for displaying 128 gray shades) are shown in the following equations.

$$\psi_6=\{+4,+4,+4,+4,-4,-4,-4,-4\} \quad (1)$$

$$\psi_5=\{+4,+4,-4,-4,0,0,0,0\} \quad (2)$$

$$\psi_4 4=\{0,0,0,0,0,0,+4,-4\} \quad (3)$$

$$\psi_3=\{0,0,0,0,+2,+2,-2,-2\} \quad (4)$$

$$\psi_2=\{0,0,0,0,+2,-2,0,0\} \quad (5)$$

$$\psi_1=\{0,0,+\sqrt{2},-\sqrt{2},0,0,0,0\} \quad (6)$$

$$\psi_0=\{+1,-1,0,0,0,0,0,0\} \quad (7)$$

These wavelets satisfy the following conditions:

1. Energy of the wavelet is proportional to an integer power of two; so that its energy corresponds to one of the gray shade bit. Energy of the wavelet means summation of the square of the amplitudes of the wavelets in all time intervals. For example, if $a_i$ is the amplitude of the wavelet in the time interval i, then the energy of wavelet is proportional to $$\sum_{i=1}^{n} a_i^2$$

wherein n is the number of discrete time intervals in the wavelet. For example, Energy of wavelet $\psi$6 is equation 1 is proportional to:

$$(+4)^2+(+4)^2+(+4)^2+(+4)^2+(-4)^2+(-4)^2+(-4)^2+(-4)^2=8(4)^2=2^7=128.$$

Similarly, Energy of wavelet $\psi$5 is equation 2 is proportional to:

$$(+4)^2+(+4)^2+(-4)^2+(-4)^2+(0)^2+(0)^2+(0)^2+(0)^2=4(4)^2=2^6=64,$$

Energy of wavelet $\psi$4 is equation 3 is proportional to:

$$(0)^2+(0)^2+(0)^2+(0)^2+(0)^2+(0)^2+(+4)^2+(-4)^2=2(4)^2=2^5=32,$$

Energy of wavelet $\psi$3 is equation 4 is proportional to:

$$(0)^2+(0)^2+(0)^2+(0)^2+(+2)_2+(+2)^2+(-2)^2+(-2)^2=4(2)^2=2^4=16,$$

Energy of wavelet $\psi$2 is equation 5 is proportional to:

$$(0)^2+(0)^2+(0)^2+(0)^2+(+2)^2+(-2)^2+(0)^2+(0)^2=2(2)^2=2^3=8,$$

Energy of wavelet $\psi$1 is equation 6 is proportional to:

$$(0)^2+(0)^2+(\sqrt{2})^2+(\sqrt{2})^2+(0)^2+(0)^2+(0)^2+(0)^2=2(\sqrt{2})^2=2^2=4, \text{ and}$$

Energy of wavelet $\psi$0 is equation 7 is proportional to:

$$(+1)^2+(-1)^2+(0)^2+(0)^2+(0)^2+(0)^2+(0)^2+(0)^2=2\,(1)^2=2^1=2.$$

2. DC free wavelets are used to ensure long life of the display; life of the LCD is reduced if DC voltages are present across the pixels.

Each one of these wavelets may be used to select an address line and deliver a quantum of energy that is proportional to one bit of the gray shade and this process could be repeated sequentially to exhaust all the bits. Then, the number of time intervals is large (56.N to display 128 gray shades) wherein N is number of address lines, even though it is smaller than (127.N for displaying 128 shades) that of the frame modulation [7] and the pulse width modulation [8]. Suppressing the zeros in the wavelets can reduce the number of time intervals to(24.N). Even then, it is more than that of the wavelet based addressing techniques that are based on selecting several address lines simultaneously [4]-[6]. The number of time intervals to complete a cycle is (8.N) if these orthogonal wavelets are used for scanning the matrix display by selecting several (3 or 4) rows simultaneously for displaying 128 gray shades. Our aim is to display a large number of gray shades with line-by-line addressing and yet ensure that the number of time intervals does not exceed that of the multi-line addressing. This goal has been achieved by selecting each row with a waveform profile that is obtained by adding all the wavelets as proposed in the following section. Although the technique is illustrated with the Haar wavelets, other orthogonal wavelets can also be used.

Consider a matrix display with N address lines and M data lines. Let the gray shade to be displayed in a pixel at the intersection of row ‘i’ and column ‘j’ be:

$$\sum_{k=0}^{g-1} d_{i,j,k}$$

Here, the index k corresponds to the gray shade bit (most significant to the least significant) of ‘g’ number of data bits. Let $\psi_k$ be the wavelet that has energy proportional to $2^k$, corresponding to the bit-k of the gray shade data. Let the row ‘i’ of the matrix display be selected with the waveform that is proportional to the waveform that is obtained by adding the ‘g’ number of wavelets. The number of wavelets is the same as the number of data bits. The expression for the select waveform is given in the following equation.

$$\text{Select } waveform_i = V_r \cdot \sum_{k=0}^{g-1} \psi_k \tag{9}$$

Wherein, $V_r$ is the proportionality constant. Hence, the select voltages during the eight time intervals in our example are as follows:

$$+9V_r, +7V_r, +\sqrt{2}V_r, -\sqrt{2}V_r, 0, -4V_r, -2V_r \text{ and } -10V_r \tag{10}$$

The other (N−1) address lines (non-selected) in the matrix display are held at ground potential. The column waveform that is to be applied to the column ‘j’ is obtained by summing the products of the value assigned to the data bit and the corresponding wavelets as shown in (11). The value assigned to the bit-k ($d_{i,j,k}$) is ‘+1’ if the bit is ‘logic-0’ and a value of ‘−1’ is assigned to the bit otherwise.

$$\text{Column } waveform_j = V_c \cdot \sum_{k=0}^{g-1} \psi_k \cdot d_{i,j,k} \tag{11}$$

Wherein, $V_c$ is amplitude of the unit voltage that serves as the constant of proportionality in the column waveforms. Multiplication of the wavelets with +1 or ‘−1’ reduces to just assigning the appropriate sign to the wavelets $\psi_k$ and summing them. The column waveform can also be obtained by the matrix multiplication by arranging the seven wavelets of equations (1) to (7) in to a 7×8 matrix and multiplying its transpose with the data vector of the pixel as shown in equation (12).

$$C_j(t) = \begin{bmatrix} +4 & +4 & +4 & +4 & -4 & -4 & -4 & -4 \\ +4 & +4 & -4 & -4 & 0 & 0 & 0 & 0 \\ 0 & 0 & 0 & 0 & 0 & 0 & +4 & -4 \\ 0 & 0 & 0 & 0 & +2 & +2 & -2 & -2 \\ 0 & 0 & 0 & 0 & +2 & -2 & 0 & 0 \\ 0 & 0 & +\sqrt{2} & -\sqrt{2} & 0 & 0 & 0 & 0 \\ +1 & -1 & 0 & 0 & 0 & 0 & 0 & 0 \end{bmatrix}^T \cdot \begin{bmatrix} d_{i,j,6} \\ d_{i,j,5} \\ d_{i,j,4} \\ d_{i,j,3} \\ d_{i,j,2} \\ d_{i,j,1} \\ d_{i,j,0} \end{bmatrix} \cdot V_c \tag{12}$$

At a given instant of time; just one voltage is applied to the selected row and it is obtained summing the elements of a column in the matrix of wavelets in (12). The column signal that is proportional to the column voltage is obtained as the dot product of the data with the column of the matrix of orthogonal wavelets. A cycle is complete when all the address lines in the matrix display are selected once. This cycle is repeated fast enough to avoid flicker. Waveforms across the pixels will be DC free as long as all the wavelets are DC free. In case the orthogonal wavelets are not DC free, then the DC free condition can be achieved by reversing the polarity of both the scanning and data waveforms in a periodic manner. Select pulses may be clustered as illustrated in FIG. 1 or it could be distributed in several frames of a cycle. The order of the voltages in the select waveform profile may be changed as long as the one to one correspondence among the wavelets and data bits is maintained while computing the column (data) voltage. RMS voltage across the pixels will be same as long as the period of a cycle is less than the response time; but the frequency spectrum across the pixels will vary depending on the distribution of select pulses in a cycle. Hence, it can be used to enhance the performance of the display like brightness uniformity of pixels, reducing power dissipation etc. The select voltages may also be distributed in to several frames to achieve such improvements. Typical waveform profiles for selecting the address lines when the number of gray shades ranges from 32 to 128 are shown in Table I. The corresponding matrices of orthogonal wavelets and the number of voltages in the scanning (row) and the data (column) waveforms are also shown in this table. An analysis of the technique is presented in the next section.

I. Analysis

Energy delivered to a pixel that is located at the intersection of ‘row-i’ and ‘column-j’ during a frame when select and data waveforms are applied to the matrix display is given by the following expression.

$$\left(V_r \cdot \sum_{k=0}^{g-1} \psi_k - V_c \cdot \sum_{k=0}^{g-1} \psi_k \cdot d_{i,j,k}\right)^2 \cdot T + (N-1) \cdot \left(V_c \cdot \sum_{k=0}^{g-1} \psi_k \cdot d_{i,j,k}\right)^2 \cdot T \tag{13}$$

The first term in this equation corresponds to the voltage across the pixel when the corresponding address line (row) is selected while the second term correspond to the data voltages appearing across the pixel when other (N−1) address lines are selected. Orthogonal condition, factors like energy of the wavelets and that of data assigned to the pixels viz. equations (14) to (16) are incorporated in to the equation (13).

$$\int_0^T \psi_i \psi_j dt = 0 \quad \forall \quad i \neq j \tag{14}$$

-continued $$\int_0^T \psi_k^2 dt = c\cdot 2^k \tag{15}$$

$$d_{i,j,k}^2 = +1 \because d_{i,j,k} = \begin{cases} +1 & \forall \text{ “logic}-0\text{” and} \\ -1 & \forall \text{ “logic}-1\text{”.} \end{cases} \tag{16}$$

Hence, the energy delivered to a pixel simplifies to the following expression:

$$E_{pixel} = V_r^2\cdot c\cdot \sum_{k=0}^{g-1}\psi_k^2 - 2\cdot V_r\cdot V_c\cdot c\cdot \sum_{k=0}^{g-1}\psi_k^2\cdot d_{i,j,k} + N\cdot c\cdot V_c^2\cdot \sum_{k=0}^{g-1}\psi_k^2 \tag{17}$$

The RMS voltage across a pixel is shown in (18).

$$V_{RMS} = \sqrt{\frac{c\cdot \sum_{k=0}^{g-1}\psi_k^2(V_r^2 - 2d_{i,j,k}\cdot V_r\cdot V_c + NV_c^2)}{n_g\cdot N}} \tag{18}$$

Here, $n_g$ is the number of columns in the matrix of wavelets. Sign of the mid term $(2\cdot d_{i,j,k}\cdot V_r\cdot V_c)$ in (18) is determined by the ‘bit-k’ of the data. RMS voltage across an ON (all the bits are ‘logic-1’ and they are assigned ‘−1’) and OFF (all the g bits are assigned +1 for ‘logic-0’) pixels is given in equation (19) and (20) respectively.

$$V_{ON}(\text{RMS}) = \sqrt{\frac{c\cdot \sum_{k=0}^{g-1}\psi_k^2(V_r^2 + 2V_rV_c + NV_c^2)}{n_g\cdot N}} \tag{19}$$

$$V_{OFF}(\text{RMS}) = \sqrt{\frac{c\cdot \sum_{k=0}^{g-1}\psi_k^2(V_r^2 - 2V_rV_c + NV_c^2)}{n_g\cdot N}} \tag{20}$$

Selection ratio defined as the ratio of RMS voltage across ON pixels to that across OFF pixels is a maximum when the condition in (21) is satisfied.

$$\left.\frac{V_{ON}}{V_{OFF}}\right|_{max.} = \sqrt{\frac{\sqrt{N}+1}{\sqrt{N}-1}} \tag{21}$$

when $$\frac{V_r}{V_c} = \sqrt{N}$$

The expressions for the RMS voltage across the ON and OFF pixels get simplified to:

$$V_{ON}(\text{RMS}) = \sqrt{\frac{c\cdot(2^g-1)\cdot 2(N+\sqrt{N})\cdot V_c^2}{n_g\cdot N}} \tag{22}$$

$$V_{OFF}(\text{RMS}) = \sqrt{\frac{c\cdot(2^g-1)\cdot 2(N-\sqrt{N})\cdot V_c^2}{n_g\cdot N}} \tag{23}$$

Contrast in the display will be a maximum when OFF pixels are applied a voltage that is near the threshold voltage of the display. Hence, the unit voltage in the column waveform is determined by equating $V_{OFF}$(RMS) to the $V_{th}$, threshold voltage of the electro-optic characteristics of LCD.

$$V_c = \sqrt{\frac{n_g\cdot N}{2\cdot c\cdot(2^g-1)\cdot(N-\sqrt{N})}}\cdot V_{threshold} \tag{24}$$

Supply voltage of the drive electronics is determined by the maximum swing in the addressing waveforms. Let the $P\cdot V_r$ be the peak to peak amplitude of the row waveforms then, the supply voltage of the addressing technique (normalized to the threshold voltage of the electro-optic characteristics of the LCD) is:

$$V_s(\text{W\_APT}) = P\cdot V_r = P\cdot\sqrt{N}\cdot V_c \tag{25}$$

$$V_s(\text{W\_APT}) = \frac{P}{2}\cdot\sqrt{\frac{n_g}{c\cdot(2^g-1)}}\cdot\left(\frac{2\sqrt{N}}{\sqrt{2\cdot\left(1-\left(1/\sqrt{N}\right)\right)}}\right) \tag{26}$$

Supply voltage of the successive approximation technique [3] that is also based on the line-by-line addressing (SA-APT) is as follows:

$$V_s(\text{SA\_APT}) = \sqrt{\frac{g\cdot 2^{(g-1)}}{2^g-1}}\cdot\left(\frac{2\sqrt{N}}{\sqrt{2\cdot\left(1-\left(1/\sqrt{N}\right)\right)}}\right) \tag{27}$$

Supply voltages of these two techniques are compared using the following ratio:

$$\frac{V_s(\text{W\_APT})}{V_s(\text{SA\_APT})} = \frac{P}{2}\cdot\sqrt{\frac{n_g}{c\cdot g\cdot 2^{(g-1)}}} \tag{28}$$

TABLE I

SELECT WAVEFORM PROFILES FOR GRAY SHADES.

| $N_g$ | Wavelets | Select waveform | $N_r$ | $N_c$ |
|---|---|---|---|---|
| 32 | $\begin{bmatrix} +2 & +2 & +2 & +2 & -2 & -2 & -2 & -2 \\ +2 & +2 & -2 & -2 & 0 & 0 & 0 & 0 \\ 0 & 0 & +2 & -2 & 0 & 0 & 0 & 0 \\ 0 & 0 & 0 & 0 & +1 & +1 & -1 & -1 \\ 0 & 0 & 0 & 0 & +1 & -1 & 0 & 0 \end{bmatrix}$ | 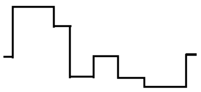 | 5 | 11 |

TABLE I-continued

SELECT WAVEFORM PROFILES FOR GRAY SHADES.

| $N_g$ | Wavelets | Select waveform | $N_r$ | $N_c$ |
|---|---|---|---|---|
| 64 | $\begin{bmatrix} +4 & +4 & +4 & +4 & -4 & -4 & -4 & -4 \\ +4 & +4 & -4 & -4 & 0 & 0 & 0 & 0 \\ 0 & 0 & +4 & -4 & 0 & 0 & 0 & 0 \\ 0 & 0 & 0 & 0 & +2 & +2 & -2 & -2 \\ 0 & 0 & 0 & 0 & +2 & -2 & 0 & 0 \\ 0 & 0 & 0 & 0 & 0 & 0 & +\sqrt{2} & -\sqrt{2} \end{bmatrix}$ | 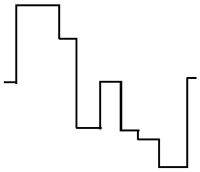 | 6 | 15 |
| 128 | $\begin{bmatrix} +4 & +4 & +4 & +4 & -4 & -4 & -4 & -4 \\ +4 & +4 & -4 & -4 & 0 & 0 & 0 & 0 \\ 0 & 0 & +4 & -4 & 0 & 0 & 0 & 0 \\ 0 & 0 & 0 & 0 & +2 & +2 & -2 & -2 \\ 0 & 0 & 0 & 0 & +2 & -2 & 0 & 0 \\ 0 & 0 & 0 & 0 & 0 & 0 & +\sqrt{2} & -\sqrt{2} \\ +1 & -1 & 0 & 0 & 0 & 0 & 0 & 0 \end{bmatrix}$ | 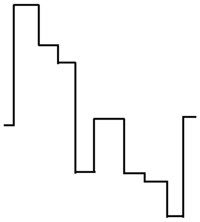 | 7 | 21 |

$N_g$:—Number of Gray Shades,
$N_r$:—Number of voltages in row waveforms and
$N_c$:—Number of voltages in the column waveforms.

TABLE II.

SUPPLY VOLATGE COMPARISON BETWEEN WAVELET AND SUCCESSIVE APPROXIMATION TECHNIQUES

| $N_g$ | Peak to peak voltage in the scanning waveforms ($V_{p\_APT}$) | Reduced peak to peak voltage in the addressing waveforms ($V_{p\_IAPT}$) | $\frac{V_s(W\_APT)}{V_s(SA\_APT)} \times 100\%$ | $\frac{V_s(W\_IAPT)}{V_s(SA\_IAPT)} \times 100\%$ |
|---|---|---|---|---|
| 32 | $7V_r$ | $4(V_r + V_c)$ | 78.26 | 89.44 |
| 64 | $(14 + \sqrt{2})V_r$ | $8(V_r + V_c)$ | 78.66 | 81.65 |
| 128 | $(15 + \sqrt{2})V_r$ | $9(V_r + V_c)$ | 77.55 | 85.04 |

II. Reducing the Supply Voltage

A technique, similar to that proposed by Kawakami et al., [9] to reduce the supply voltage of the conventional line-by-line addressing can be adopted to reduce the supply voltage of the drive electronics. Let us consider the example of the waveforms for displaying 128 gray shades. The voltages in the select waveform starting from the first to the eighth time intervals in order (a profile that is slightly different from that of (10) is chosen here) are:

$$+9V_r, +7V_r, +4V_r, -4V_r, 0, -4V_r, -(6-\sqrt{2})V_r \text{ and } -(6+\sqrt{2})V_r \quad (29)$$

Data voltages in the $1^{st}$ and $2^{nd}$ time intervals are:

$$\pm 9V_c, \pm 7V_c, \text{ and } \pm V_c. \quad (30)$$

Data voltages in the third and fourth time intervals are:

$$\pm 12V_c \text{ and } \pm 4V_c \quad (31)$$

Similarly the data voltages in the fifth and sixth time intervals are:

$$\pm 8V_c, \pm 4V_c \text{ and } 0 \quad (32)$$

Finally, the data voltages in the seventh and eighth time intervals are as follows:

$$\pm(6+\sqrt{2})V_c, \pm(6-\sqrt{2})V_c, \pm(2+\sqrt{2})V_c \text{ and } \pm(2-\sqrt{2})V_c \quad (33)$$

The maximum amplitude of instantaneous voltages across any pixel is $9(V_r+V_c)$.Hence, the supply voltage can be reduced by:

1. Shifting both the row and column waveforms by $(9V_c)$ during the first two intervals;
2. Shifting the row and column waveforms by $(4V_r+12V_c)$ for the third to sixth time intervals; and
3. Shifting by $8V_r$ during the last two time intervals.

Then, the voltages in the select waveform are modified as follows:

$$+9(V_r+V_c), +(7V_r+9V_c), +(8V_r+12V_c), +(12V_c), +(4V_r+12V_c), +(12V_c), +(2+\sqrt{2})V_r \text{ and } +(2-\sqrt{2})V_r \quad (34)$$

The modified data voltages are as follows:

In the $1^{st}$ and the $2^{nd}$ time intervals:

$$+18V_c, 0, +16V_c, 2V_c, +10V_c \text{ and } +8V_c \quad (35)$$

In the $3^{rd}$ and $4^{th}$ time intervals:

$$+(4V_r+24V_c), +(4V_r), +(4V_r+16V_c) \text{ and } +(4V_r+8V_c) \quad (36)$$

In the $5^{th}$ and $6^{th}$ intervals:

$$+(4V_r+20V_c), +(4V_r+4V_c)+(4V_r+16V_c), +(4V_r+8V_c) \text{ and } +(4V_r+12V_c) \quad (37)$$

The data voltages in the last two intervals are:

$$(8V_r \pm(6+\sqrt{2})V_c), (8V_r \pm(6-\sqrt{2})V_c), (8V_r \pm(2+\sqrt{2})V_c) \text{ and } (8V_r \pm(2-\sqrt{2})V_c) \quad (38)$$

The voltage transformation is not unique, the transformation described in the previous paragraphs is well suited for LCD drivers with the lowest voltage as the common rail and all other voltages in the addressing waveforms are positive with reference to this common voltage. An example of the voltage transformation that is better suited for the LCD drivers with most positive voltage as the common rail is outlined next. Both the row and column waveforms are shifted as follows:

1. Down by $9V_r$ during the first two time intervals;
2. Down by $4V_r$ during the third to sixth time intervals; and
3. Down by $1.5V_r$ during the last two time intervals.

Then, the voltages in the select waveform get modified as follows:

$$0,-2V_r,0,-8V_r,-4V_r,-8V_r,-(7.5-\sqrt{2})V_r \text{ and } -(7.5+\sqrt{2})V_r \quad (39)$$

The modified data voltages are as follows:

In the 1st and the 2nd time intervals:

$$-(9V_r\pm 9V_c),-(9V_r\pm 7V_c) \text{ and } -(9V_r\pm V_c) \quad (40)$$

In the 3rd and 5th time intervals:

$$-(4V_r\pm 12V_c) \text{ and } -(4V_r\pm 4V_c) \quad (41)$$

In the 4th and 6th intervals:

$$-(4V_r\pm 8V_c),-(4V_r\pm 4V_c) \text{ and } -4V_r \quad (42)$$

The data voltages in the last two intervals are:

$$-(1.5V_r\pm(6+\sqrt{2})V_c),-(1.5V_r\pm(6-\sqrt{2})V_c),-(1.5V_r\pm(2+\sqrt{2})V_c) \text{and } -(1.5V_r\pm(2-\sqrt{2})V_c) \quad (43)$$

Number of voltages in the scanning waveform increases from 7 to 9 (or 10) as compared to 3 (or 4) in the conventional line-by-line addressing. The non-select voltages when the common rail is the most negative voltage are $+9V_c$, $(4V_r+12V_c)$ and $8V_r$. Similarly, the non-select voltages when the most positive voltage is the common rail are $-9V_r$, $-4V_r$ and $-1.5V_r$. It is important to note that the number of voltages in the data waveforms does not change where as it doubles (from 2 to 4 voltages) in the conventional addressing technique. Supply voltage will be proportional to $9(V_r+V_c)$ as compared to $(15+\sqrt{2})V_r$. The percentage reduction in supply voltage due to modification in the addressing waveforms is:

$$\frac{Vs(\text{W\_IAPT})}{Vs(\text{W\_APT})} = \left(1 - \frac{9(\sqrt{N}+1)}{(15+\sqrt{2})\sqrt{N}}\right)\cdot 100 \approx 45\% \quad (44)$$

The modification of the addressing waveforms is not unique; the shift in the addressing waveforms has to be such that the difference among these voltages is equal to the maximum voltage across the pixels. For example, it is sufficient to ensure that all the voltages in the scanning and data waveforms lie with in the voltage range of $9(V_r+V_c)$, the maximum voltage across the pixel during a cycle. Supply voltages of the wavelet based line-by-line addressing with modified waveforms ($V_s$(W_IAPT)) and the successive approximation technique based on the line-line-addressing with modified waveforms ($V_s$(SA_IAPT)) are also compared in Table II.

III. Drive Electronics

Figure 4A:
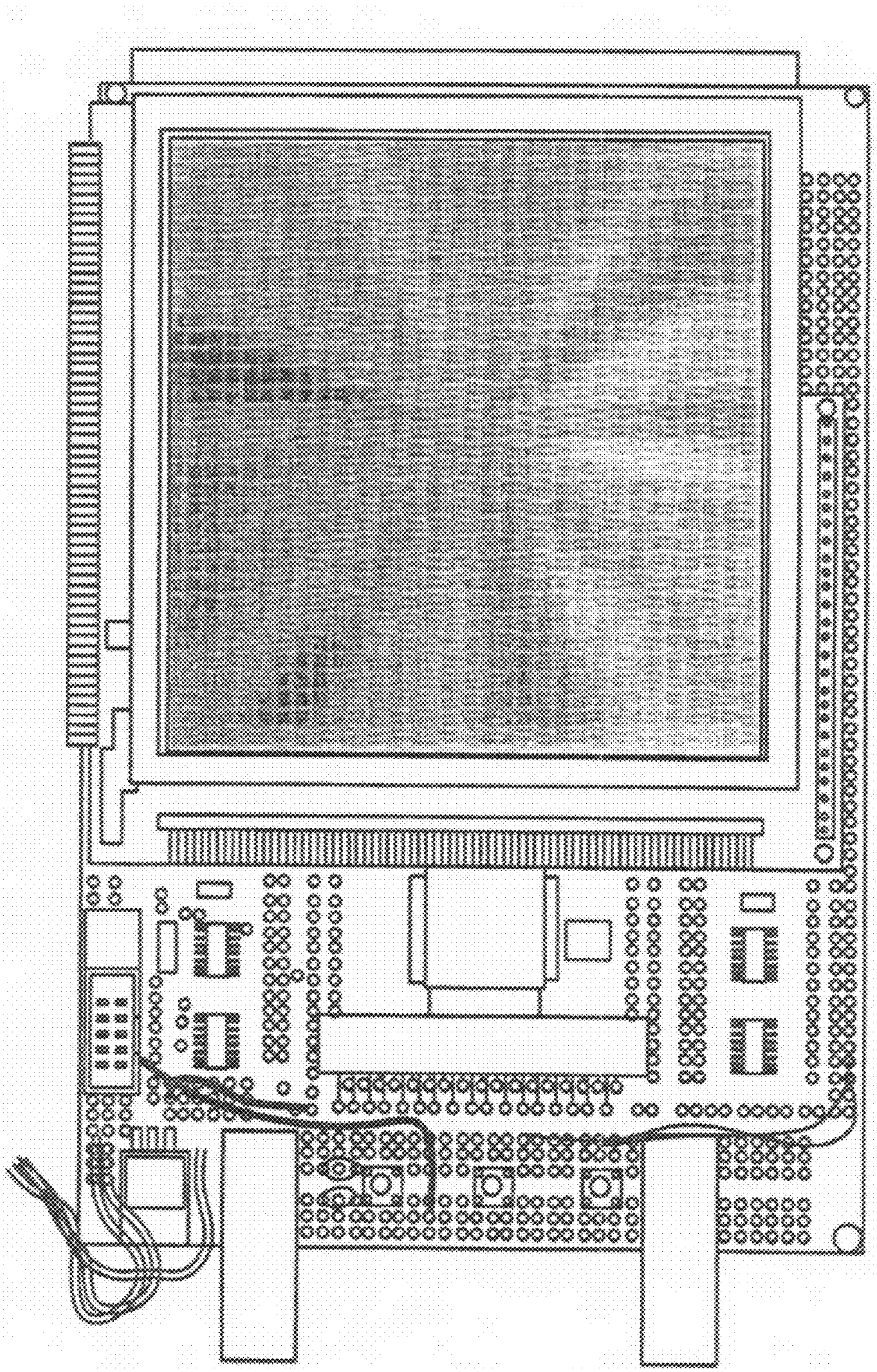
Figure 4B:
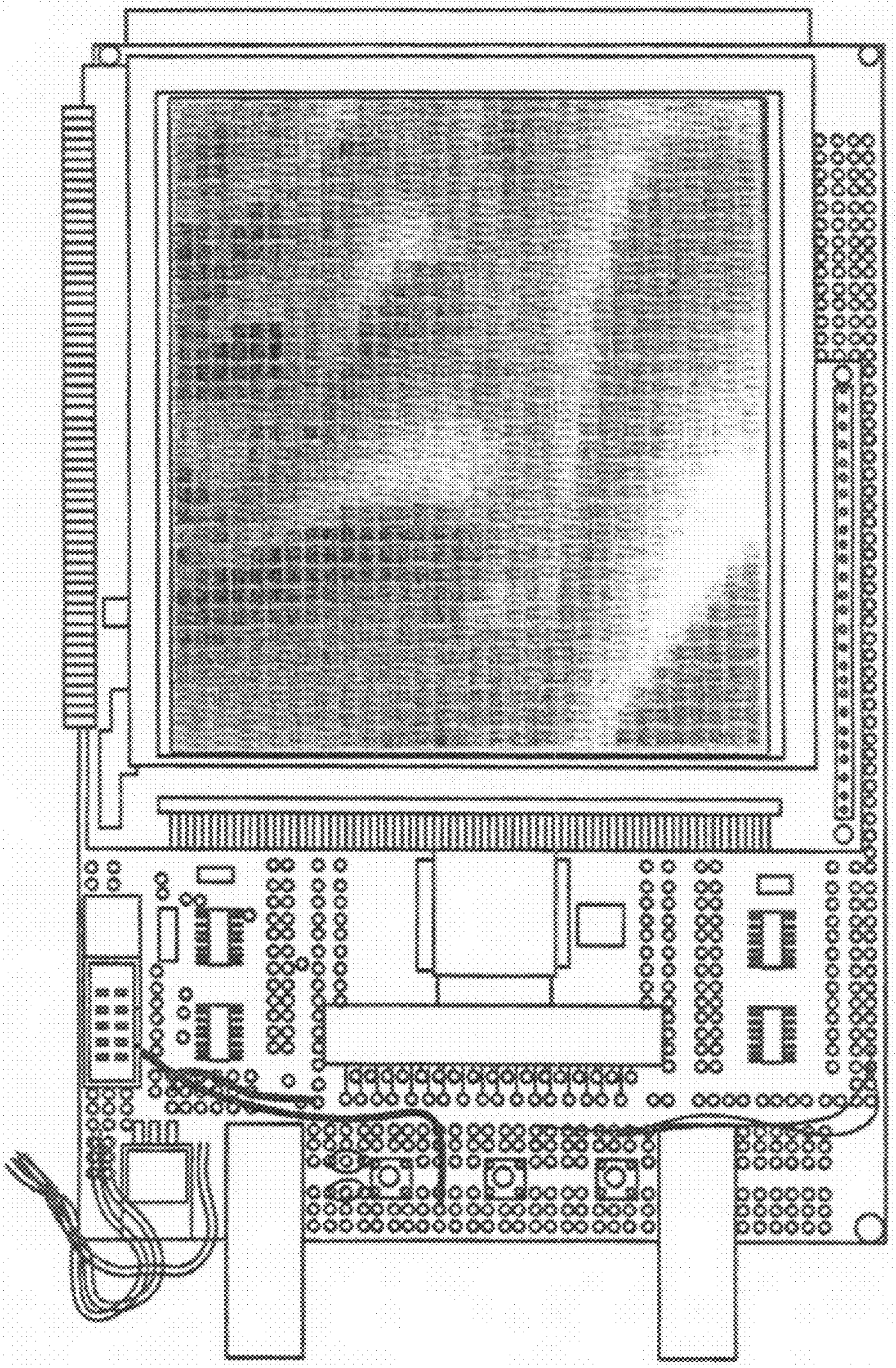

A block diagram of the prototype is shown FIG. 3. Voltages in the addressing waveforms are generated using a resistor network. The number of voltages in the addressing waveform decides the hardware complexity of the drivers. Number of voltages in the scanning waveform ranges from 6 to 11 as the number of gray shades is increased from 8 to 128. However, at a given instant of time just two voltages viz., select and non-select voltages are necessary for scanning the matrix display. Hence, the hardware complexity is the same as that of the conventional line-by-line addressing for displaying bi-level images. LCD drivers like the HD-44100 can be used along with a few multiplexers to select and route the appropriate voltages from the voltage level generator. Number of voltages in the data waveforms is at least 21 for displaying 128 gray shades as shown in Table I. It demands a display driver having 5-bit shift register, 5-bit latch and an analog multiplexer (21:1) for each output. The number of voltages is limited to just eight at any instant of time and a good reduction in hardware complexity of the driver can be achieved when this observation is incorporated in the design. LCD drivers with 3-bit shift register, 3-bit latch and analog multiplexers (8:1) for each output are adequate as data drivers (for example: TMS57206). Hence, a 40% in the shift register & latches and 58% reduction in the analog switches in the multiplexers are achieved. Number of stages in the column driver is equal to the number of columns and hence this reduction is substantial. The reduction is about 62% for the shift registers & latches 96% for the analog switches of the output stage of the drivers if the technique is compared with amplitude modulation for the same number of gray shades. Although, the column voltages are computed as the dot product of the select pattern and the corresponding data vectors, it is not necessary to compute them on the fly; they can be computed once and they can be incorporated in to the voltage level generator. Analog multiplexers in the driver circuit are used to apply these voltages depending on the select voltage and the data. The controller is designed to select one row at a time with all the eight row select voltages. During each select voltage, the voltages corresponding to the data of the pixels are applied on the column side. The pixel values (data) are stored in an EPROM in continuous memory locations as a 1-dimensional array. The addresses corresponding to the data of the pixels in the selected row are generated repeatedly for all the select voltages (once per each select voltage). Similarly, all the other rows are selected one at a time and the display is refreshed continuously. The controller was implemented using a CPLD (complex programmable logic device). Illustrations of a useful LCD decice are shown in FIGS. 4A and 4B. Typical row and column (data) waveforms are shown in FIG. 5. Typical waveform across a pixel is shown in FIG. 6.

IV. Comparison

Amplitude modulation [1] and the very similar Pulse height modulation (PHM) [2] can display 128 gray shades in (4.N) time intervals with 254 voltages in the column (data) waveforms and 3 voltages in the scanning waveforms. It may be more appropriate to compare the wavelet-based technique with the successive approximation technique [3] since both the techniques are based on delivering energies that are proportional to the bit-weight of the gray shade data in several time intervals. A comparison of the wavelet-based technique with amplitude modulation and successive approximation based on line-by-line addressing is given in Table III.

V. Conclusion

Number of time intervals to complete a cycle is less in the wavelet-based technique as compared to the successive approximation technique when all other parameters are equal. Slow scanning is helpful to reduce the power consumption [10]. The brightness non-uniformity of pixels due to distortion in the addressing waveforms will also be less because the select time is larger when the number of time intervals is small. A lower supply voltage of the wavelet-based technique is advantageous in portable devices. It has been achieved with out increasing the hardware complexity of the row drivers and a moderate increase in hardware complexity of the column drivers. Increasing the number of voltages in the column waveform by a factor of 4 has paved way to an increase in number of gray shades by factor 64; when wavelet based addressing (WAT) is used for scanning the matrix LCD.

TABLE III

Comparison of the Gray Shade Techniques (128 ray shades)

| Parameter | Amplitude modulation and PHM (line-by-line) technique | Successive approximation technique | Wavelet based technique |
|---|---|---|---|
| Number of time intervals for 128 gray | 4N | 14N | 8N |
| Supply voltage | Low | High | Intermediate |
| Number of voltages in scanning | 3 | 15 (22 for IAPT) | 7 (10 for IAPT) |
| Number of voltages in the data waveforms | 254 | 14 (22 for IAPT) | 21 (21 for IAPT also) |

* IAPT: Improved Alt and Pleshko Technique

I claim:

1. A method for line-by-line addressing of RMS responding display matrix with wavelets, said method comprises steps of:

a) selecting a set of orthogonal wavelets;

b) representing the orthogonal wavelets as a wavelet matrix;

c) obtaining a select waveform by summing elements of the wavelet matrix column-wise;

d) choosing a row of the display matrix at a time;

e) obtaining a data waveform for each column depending on a gray shade of a pixel in the chosen row;

f) applying the select waveform to the chosen row and, simultaneously, applying the data waveforms to the columns, while all of the other rows of the matrix display are grounded; and g) repeating steps c) through f) until each row of the display matrix has been chosen to complete a cycle.

2. The method as claimed in claim 1, wherein energy of each of the wavelets is proportional to an integer power of two.

3. The method as claimed in claim 1, wherein a constant of proportionality is included to increase or decrease the amplitude of the data waveforms.

4. The method as claimed in claim 1, wherein the data waveform for a given column is obtained by multiplying each of the orthogonal wavelets of the wavelel matrix by a corresponding value of a data bit and summing the products.

5. The method as claimed in claim 1, wherein the select waveform and the data waveforms are shifted by predetermined voltages during predefined time intervals to reduce power supply voltage of driver circuit.

6. The method as claimed in claim 1, wherein an order of applying voltages in the select waveform is changed retaining the one-to-one correspondence among the voltages in the select waveform and the data waveforms to reduce power dissipation in the drivers.

7. The method as claimed in claim 1, wherein the voltages of the select waveform and the corresponding voltages in the data waveforms are distributed into several frames.

8. The method as claimed in claim 1, wherein the number of voltages in the select waveform and the data waveforms determines the number of gray shades.

9. The method as claimed in claim 8, wherein the number of gray shades increases with an increase in the number of voltages in the select waveform and the data waveforms.

10. The method as claimed in claim 1, wherein each wavelet is a Haar wavelet.

11. The method as claimed in claim 1, wherein the wavelets are DC free.

12. The method as claimed in claim 1, wherein the data waveform of a given column is obtained by dot product of data with the transpose of the wavelet matrix.

13. The method as claimed in claim 1, wherein a constant of proportionality is included to increase or decrease the amplitude of the select waveform.

14. The method as claimed in claim 5, wherein the data bit is assigned with values of '+1' and '−1' when the data bit is a logic '0' and a logic '1,' respectively.

15. The method as claimed in claim 1 further comprising repeating the steps of d) through g) at a faster rato to avoid flicker.

* * * * *